April 8, 1941.   U. O. HUTTON   2,237,558
AIRCRAFT EXHAUST-GAS TESTING APPARATUS
Filed Oct. 22, 1937   3 Sheets-Sheet 1

INVENTOR
ULRIC O. HUTTON
BY
Robert Irving Williams
ATTORNEY

April 8, 1941.    U. O. HUTTON    2,237,558
AIRCRAFT EXHAUST-GAS TESTING APPARATUS
Filed Oct. 22, 1937    3 Sheets-Sheet 2

INVENTOR
ULRIC O. HUTTON
BY Robert Irving Williams
ATTORNEY

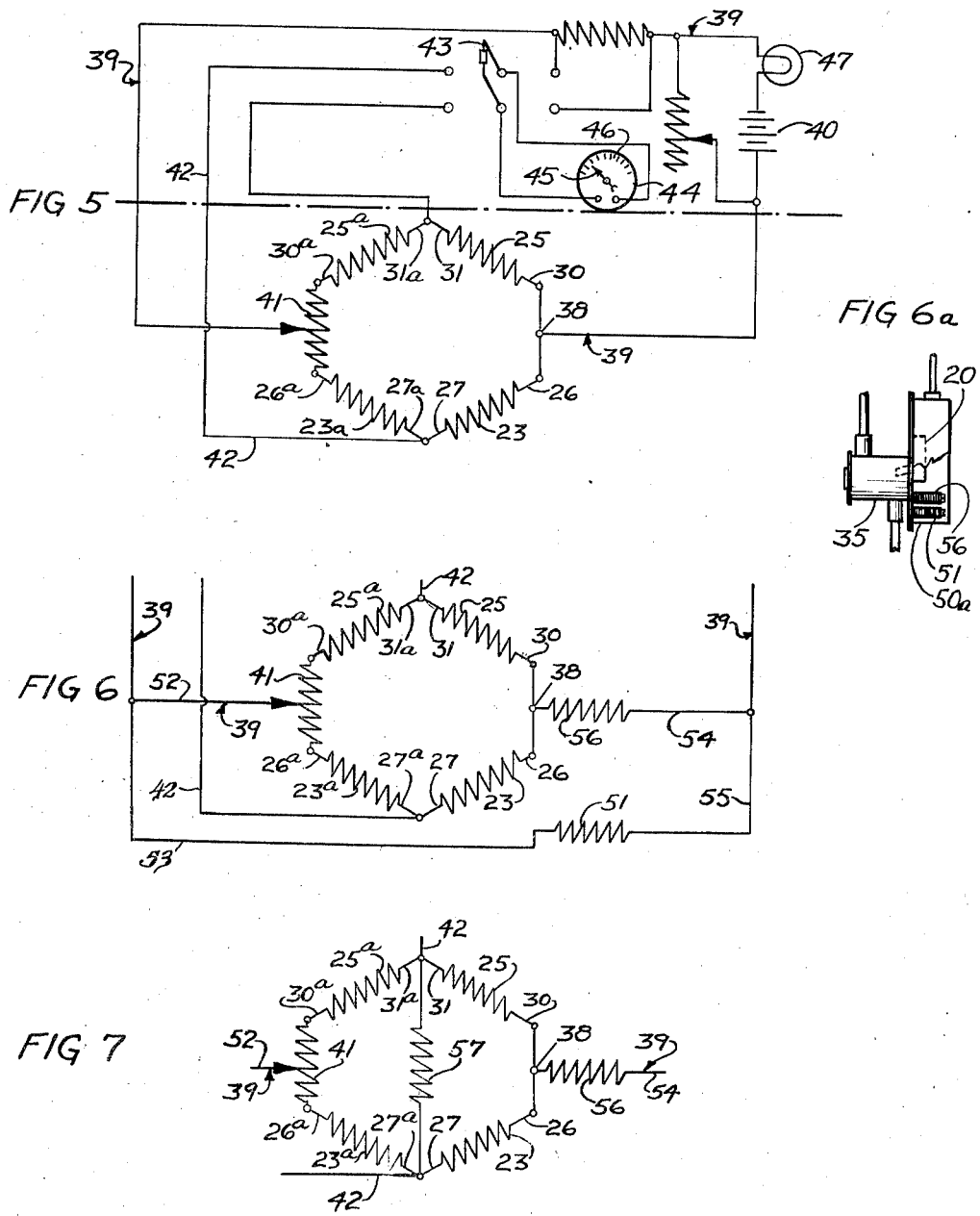

Patented Apr. 8, 1941

2,237,558

UNITED STATES PATENT OFFICE 2,237,558

AIRCRAFT EXHAUST-GAS TESTING APPARATUS

Ulric O. Hutton, New Castle, N. Y., assignor to Cambridge Instrument Company, Inc., Ossining, N. Y., a corporation of New York Application October 22, 1937, Serial No. 170,404

10 Claims. (Cl. 73—51)

This invention relates to gas testing apparatus, and more specifically to apparatus for testing the exhaust gases from aircraft engines.

An object of the invention is the provision of improved means for testing a gas by the thermal-conductivity method.

A more specific object is the provision of improved means for obtaining accurate measurement of the character of the exhaust gas of an aircraft engine.

Other objects of the invention will in part be obvious and will in part appear hereinafter.

The invention accordingly comprises the features of construction, combinations of elements, and arrangement of parts, which will be exemplified in the constructions hereinafter set forth and the scope of the application of which will be indicated in the claims.

For a fuller understanding of the nature and objects of the invention reference should be had to the following detailed description taken in connection with the accompanying drawings, in which:

Fig. 5 is a diagrammatic showing of the electrical circuit employed in one form of construction embodying the invention;

Figure 1:
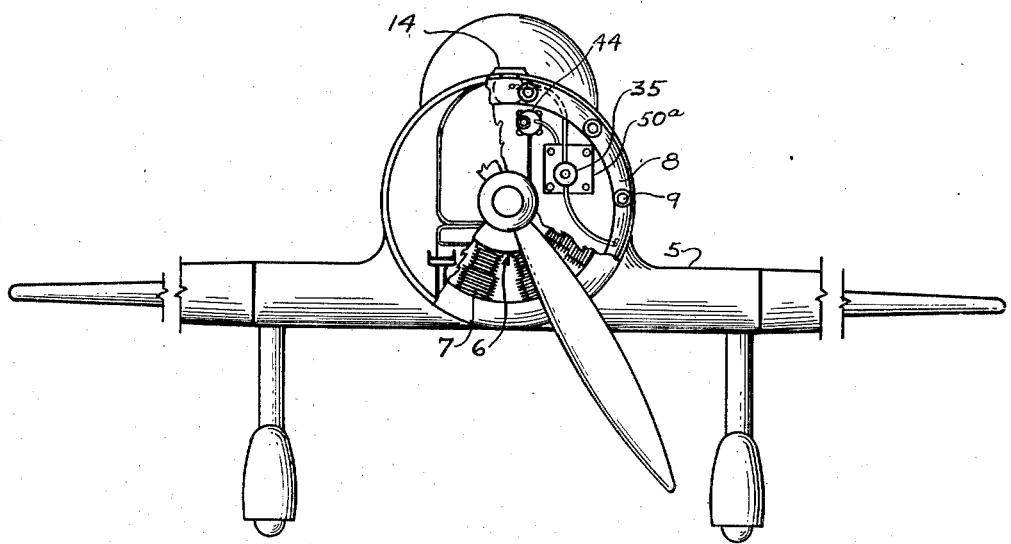
Figure 1 is a front view of an airplane embodying the invention, certain of the parts being broken away.
Figure 4:
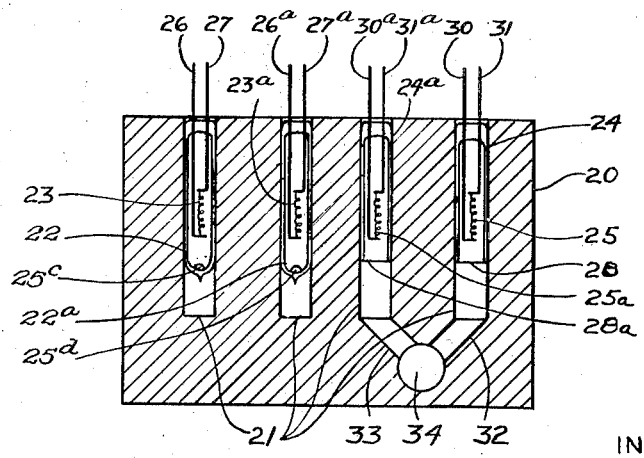
Fig. 4 is a further enlarged view of a section taken along the line 4—4 of Fig. 3.
Figure 2:
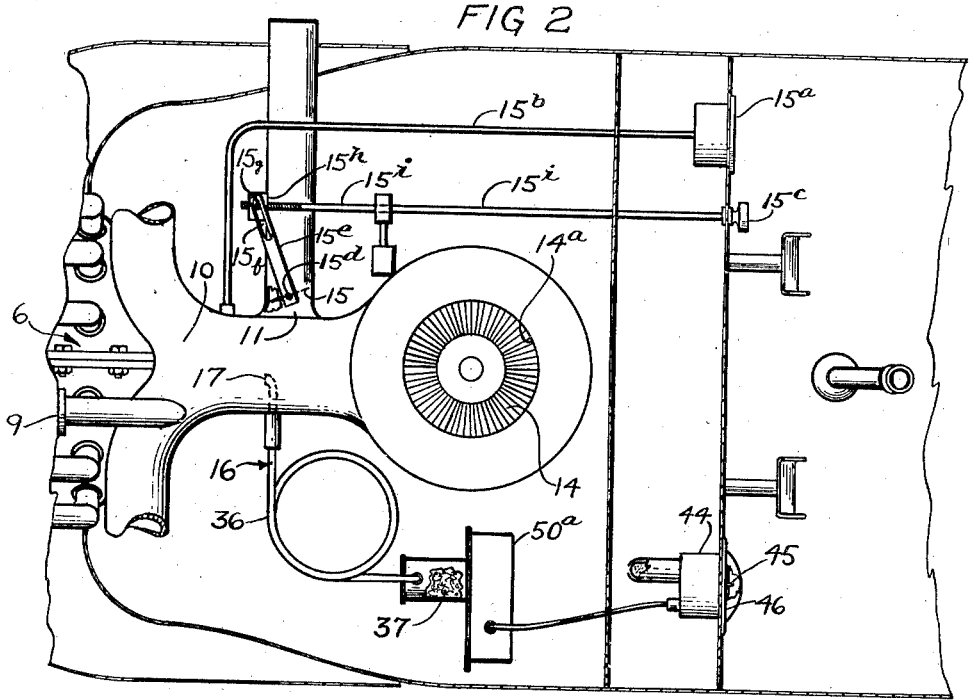
Fig. 2 is an enlarged top view of a portion of the exhaust channel of the engine thereof and of the testing apparatus.
Figure 3:
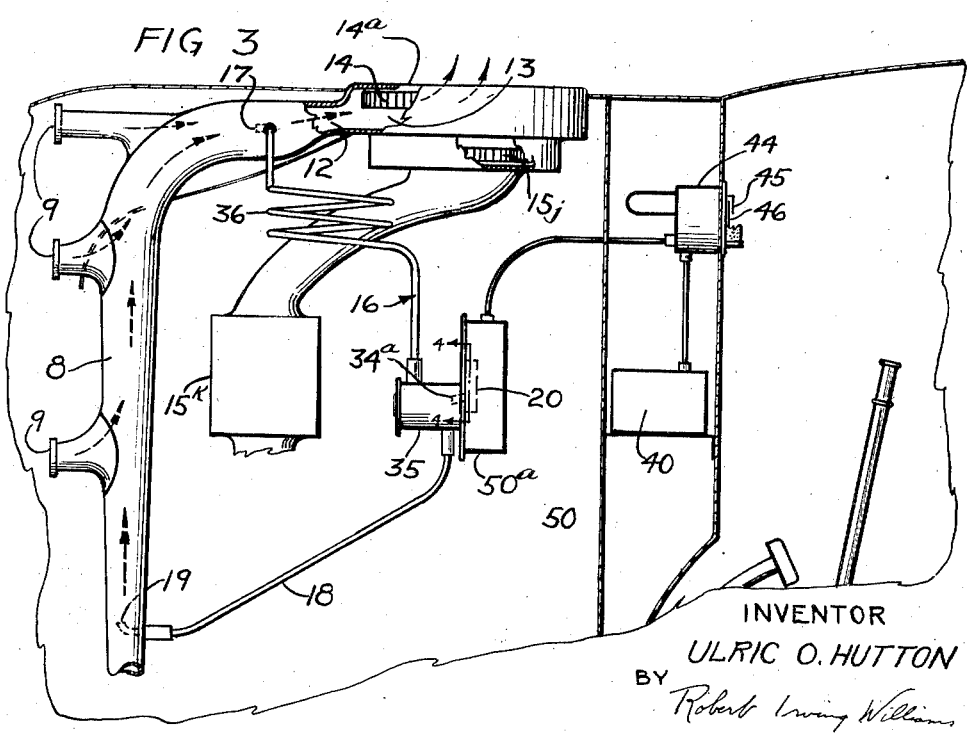
Fig. 3 is a side view thereof.

Fig. 6 is a similar showing of the modified part of the electrical circuit employed in another form of construction embodying the invention, Fig. 6a is a view similar to a portion of Fig. 3 and exemplifying the location of certain of the parts of the form of construction exemplified in Fig. 6; and Fig. 7 is a fragmentary diagrammatic showing of the modified part of the electrical circuit employed in another form of construction embodying the invention.

A particularly simple method for obtaining an indication of the characteristics of the mixture used in an internal combustion engine is by the determination of the thermal conductivity of the exhaust gas therefrom, since, in the range of proportions of fuel and air used in normal operation, an increase in the proportion of fuel in the mixture causes an increase in the thermal conductivity of the gas, and similarly an increase in the proportion of air in the mixture causes a decrease in the thermal conductivity. With this in mind, various thermal-conductivity measuring devices employing electrical circuits of the Wheatstone-bridge type have been proposed for determining the correctness of the mixture employed from time to time in internal combustion engines. In such devices a resistance forming part of one arm of the bridge has been surrounded with a reference gas, and a resistance forming part of an adjacent arm of the bridge has been surrounded with the gas to be tested. Various types of such arrangements, which have been utilized in automobiles and under other conditions where the testing apparatus was not subject to large changes in pressure and other variables, have been found unsatisfactory for use in high-altitude aircraft because of various conditions including the large differences in pressure encountered in flying to high altitudes. These conditions have introduced difficulties in the maintenance of a gas of satisfactorily uniform thermal conductivity in the reference cell. They have also introduced into the test gas variables other than that of the constituents thereof. Undesirable inaccuracies in the indication of the character of the aircraft exhaust-gas are also caused in many instances by changes in temperature in the portion of the aircraft wherein the thermally-responsive portions of the testing apparatus are placed. There are also other exacting requirements involved in the testing of aircraft exhaust gases which impose difficulties in the provision of satisfactory testing apparatus.

It is also often desirable in an arrangement such as contemplated that the Wheatstone bridge or other electrical measuring means be energized from the engine battery or from other current-supply means upon which varying loads are imposed as, for example, power supply systems utilized for lighting an aircraft; but it has been found that, because of varying loads imposed upon the current-supply means or of other factors which cause variation in the current supply thereby, inaccuracies of indication result.

With a view to reducing or eliminating the foregoing and other difficulties, the present invention contemplates the provision of gas-testing apparatus and of associated structures of such character that the determination of the characteristics of exhaust gases in aircraft, and particularly in high-altitude aircraft, may be made by the thermal-conductivity method with improved accuracy.

Among the features of construction entering into one or more of the combinations contemplated by the invention in its various aspects are the provision of a reference cell containing water-saturated reference gas and an excess of water, the provision of practical and effective means for providing reference and test gas at a satisfactorily similar pressure, of a reference cell the walls of which are permanently impermeable and substantially non-corrodible by the gas therein, of improved conduit arrangements for bringing the test gas from the exhaust collector ring of an airplane engine or from another exhaust channel to the test cell and for assuredly and effectively carrying it away from the test cell without affecting the pressure therein, of means for compensating to a desired extent for temperature variations at the point of measurement which would otherwise unsatisfactorily affect the accuracy of the testing apparatus, and of means for avoiding variations in current supply to the electrical measuring means. Such current supply means will, in many instances, consist of the engine battery. In other instances it may consist of a supplemental power plant, such as is utilized to supply current for lighting, cooking, etc. in large airplanes and other aircraft. In either case, the current flow will normally vary due primarily to the varying loads imposed on the current-supply means.

In Figs. 1 thru 5 there is exemplified an airplane 5 having an internal combustion engine 6 of the usual type and comprising cylinders 7 which discharge their exhaust gases into an exhaust channel in the form of a manifold or collector ring 8, the openings from the cylinders to the collector ring being shown at 9. At the upper end of the collector ring the sides thereof merge into an exhaust pipe 10, forming a part of the exhaust channel and having an outlet 11. In the present instance the pipe 10 is provided with a secondary outlet 12 opening into a chamber 13 in which there is disposed an exhaust turbine 14 having an outlet 14a; and the outlet 11 is provided with a valve 15. At 15a there is provided a pressure gage connected by a tube 15b to the inside of the pipe 10. As will be appreciated, when the airplane is on or near the ground at sea level, the valve 15 will be open, and the pressure gage will indicate sea-level pressure. As the plane rises, however, the pressure gage will indicate successive changes in pressure, whereupon the valve will be turned toward closed position, being turned further and further toward closed position as the pressure gage repeatedly indicates a change from sea-level pressure as the plane climbs. In order to operate the valve 15, there is provided a knob 15c in the cockpit. The rod 15d of the valve 15 is connected to the knob by means of a link 15e having a slot 15f thru which there extends a pin 15g on a nut 15h into which the end of a rod 15i is threaded. The rod 15i is fixed to the knob 15c and is rotatably mounted in portions of the framework. The movement of the valve 15 toward closed position tends to limit the escape of gas from the pipe 10, and to build up pressure therein, and, since the outlet 14a of the turbine is open to the outer air, more and more of the gas in trying to escape will pass thru the turbine and operate the same. The valve 15 will be moved in each instance until the pressure gage returns to its original sea-level reading. The turbine is arranged to operate a blower 15j to supply air under pressure to the carburetor 15k of the engine. As high altitudes are reached a greater pressure is required from the blower in order to supply the same quantity of air to the carburetor as was normally supplied at sea level; and the maintenance of a substantially sea-level pressure in the pipe 10 assures a proper supply of the mixture to the carburetor. A trained pilot can thus determine the proper setting of the valve 15 by listening to the engine operation, even without the pressure gage. In an airplane adapted for operation with the valve 15 open at sea level, the valve 15 will be so operated as to maintain in the exhaust channel an absolute pressure of between twenty-four inches and thirty-six inches of mercury at all times, under ordinary operating conditions. There are thus provided, whether or not the pressure gage is present, means for causing exhaust gas in the pipe to be at substantially sea-level pressure. It is to be borne in mind in this connection that in certain instances aircraft engines are designed for operation when the pressure in the exhaust channel is other than sea-level pressure. In such instances regulatory means of the character described, or of other suitable type, may be employed to maintain the pressure in the exhaust channel at substantially the desired or "selected" pressure, as, for instance, within a few inches of mercury above or below a particular pressure selected, whether this selected pressure is above or below sea-level pressure.

Leading from the interior of the pipe or exhaust channel 10 is a conduit 16 having an open end 17, which in accordance with the invention in its more specific aspects, faces toward the escaping exhaust gases; and a second conduit 18 provides a return to the exhaust channel entering the collector ring and having an open end 19, which, in accordance with the invention in its more specific aspects, faces away from the direction of movement of the exhaust gases therein. As hereinafter exemplified, the conduits 16 and 18 form part of a closed circuit communicating with a test cell of a testing apparatus. Thus, in conjunction with the turbine and the valve 15, they provide means whereby the gas admitted to the test cell is maintained at a pressure bearing a definite relation to the pressure in the exhaust channel. Ordinarily, and as exemplified, the pressure in the test cell will be the same as the pressure in the exhaust channel, but it will be appreciated that the communicating means may be of such character that some reduction of pressure may occur between the exhaust channel and the test cell. In the exemplified form of apparatus, however, where the pressure in the exhaust channel is maintained at substantially sea-level pressure, the pressure of the gas in the test cell will likewise be at substantially sea-level pressure.

In proximity to the point where the conduits 16 and 18 join, there is provided a cell-carrying portion of testing apparatus. In the present instance, this portion comprises a brass cell-block 20, having a pluraltiy of vertical cylindrical bores 21 formed therein. In one of these bores there is provided a reference cell 22, consisting of a glass bulb, and providing an enclosure for a reference gas and containing an electrical resistance element 23 which is adapted to be heated by the passage of current therethru and the conductivity of which is dependent upon the amount of heat conducted away therefrom. In another of the bores there is provided a test cell 24 providing a chamber for the test gas and containing an electrical resistance element 25 similar to the resistance 23. In the present instance a second and similar reference cell 22a containing a resistance 23a, and a second and similar test cell 24a containing a resistance 25a are provided in other bores of the block for the purpose of increasing the accuracy of measurement; but these, while desirable, are not essential.

The reference cells 22 and 22a each contain a water-saturated reference gas, such, for instance, as air, and an excess of water—ordinarily in the form of a small drop (as indicated at 25c and 25d) in the bottom of the cell—so as to assure that the reference gas will at all times be saturated with water; and the reference gas is provided, in the present instance, in such quantity as to be at substantially sea-level pressure at those temperature ranges—for instance, a range of from 30 degrees Fahrenheit to 100 degrees Fahrenheit—to which it is ordinarily subjected. The quantity of gas within reference cell or cells may be in such definite amount as to be substantially at some definite pressure other than sea-level, but, where water-saturated gas is employed, the pressure of the gas within the test cell or cells and the pressure of the gas within the reference cell or cells should be substantially similar.

The walls of the reference cells are of such character that they will permanently seal gas therein so as to avoid leakage, even at relatively high pressure differentials and that they will not be corroded by the water-saturated gas; being preferably, and as exemplified, in the form of glass bulbs. Among other materials which are satisfactory for use as material for the formation of the reference cells are other vitreous materials such as quartz. Leads 26 and 27 are sealed in the glass walls of the cell 22, and leads 26a and 27a are sealed in the glass walls of the cell 22a, and extended to the ends of the resistances 23 and 23a, respectively, in these cells. These resistances, and so much of the leads as are within the cells, are formed of non-corrodible material, such, for example, as platinum, altho other suitable materials, such, for instance as platinum-iridium alloys may be employed. In this connection, it is to be understood that the terms "non-corrodible" and the like, as used herein, are to be understood as referring to materials which are non-corridible by the water-saturated gas within the cell under the usual conditions of use. The cells 24 and 24a are, in the present instance, formed similarly to the cells 22 and 22a, except that the lower end of the glass (or other vitreous) bulb is cut away to provide openings 28 and 28a, respectively. Leads 30 and 31 extend, respectively, from the outside of the cell 24 to ends of the resistance 25, and leads 30a and 31a similarly extend to the ends of the resistance 25a in the cell 24a. The resistances and leads are, in the present instance, formed of materials which are similar to the materials of which the resistances 23 and 23a and the leads 26 and 27, and 26a and 27a are composed. It is to be observed that no corrosion can occur at any point on the walls of the cells 24 and 24a which is in sufficient proximity to the resistance therein so that thermal conduction from these resistances will be interfered with by corrosion to any substantial extent, or which is so disposed that the products of corrosion might be transferred in any substantial amount from the walls to the resistances or other wiring; and that the thermal conductivity from the resistances 23 and 23a to the walls of the cells 22 and 22a cannot be interfered with either by corrosion or by gaseous products of corrosion which might be formed if corrosion took place.

The bores 21 containing the cells 24 and 24a, are extended as at 32 and 33 to communicate with a bore 34 forming a part of a breather tube 34a, which extends to a widened conduit portion 35 providing a junction of the conduits 16 and 18. This arrangement assures that the gas passing thru conduits 16 and 18 will pass into the cell 24 (and the cell 24a) sufficiently quickly so that there will be no marked lag in a change of composition in the test cell after gas of changed composition is present in the exhaust channel.

As will be seen, the conduit 16 extends thru a considerable distance between the point where it leaves the exhaust channel to the point where it joins the conduit portion 35, being in the present instance coiled as indicated at 36. It is also to be observed that the point where the conduit 16 leaves the exhaust channel is considerably higher than the point where the conduit 18 enters it, and that the entire line is formed without pockets. This arrangement assures that the excess water vapor carried by the hot exhaust gas as it leaves the engine will be condensed in the coil 36, and the condenser water will be conducted by the conduit 18 back to the exhaust channel to where it will be again evaporated by the hot exhaust gas. Thus, the gas entering the tube 34a will contain an amount of water-vapor substantially corresponding to its saturation point under the temperature conditions surrounding the pipe 16 and the testing apparatus, and condensation of water-vapor within the cells 24 and 24a will be substantially avoided. The exhaust gas, reaching the cell 24 (and the cell 24a) will be substantially at the temperature of the reference gas in the cell 22 and in the cell 22a, being subject to the same temperature conditions, and will be substantially water saturated. Moreover, as brought out above, this gas will, under normal operating conditions, be maintained at substantially sea-level or other selected pressure regardless of the altitude of the airplane.

Preferably a filter, as indicated at 37, is provided in the conduit portion 35 so as to prevent soot and other foreign particles from reaching the cells 24 and 24a where they might become deposited on the walls thereof and alter the thermal-conductivity characteristics.

As will be seen from Fig. 5, the leads 26 and 30 from the resistances 23 and 25 are joined at 38 to a circuit portion 39 which includes a battery 40, which, in the present instance, is the battery of the engine 6 of the airplane and is arranged to be charged by the engine and to supply starting current in the usual manner. The circuit is completed thru portions of a variable resistance 41 from which the leads 26a and 30a extend to the resistances 23a and 25a. The leads 27 and 27a meet at one end of a conductor 42, which extends thru a switch 43 and a galvanometer 44 to a point at which it joins the leads 31 and 31a; thus providing a Wheatstone bridge of which the resistance 23 and 25 constitute adjacent arms and of which the resistance 23a and 25a also constitute adjacent arms. The fluctuations of the galvanometer are indicated by a pointer 45 on a dial 46 in the cockpit of the airplane. The galvanometer 44 is of standard form.

In order to eliminate the effect of variable voltage in the battery 40 due to the engine operation, there is provided in the circuit 39, in accordance with the invention, a ballast resistance 47 or other current-regulating means. The ballast resistance may be of any well-known or suitable type, as, for instance an iron or tungsten filament operated at a suitable temperature in a bulb containing hydrogen at a selected pressure. A desirable type of current-regulating or ballast tube for use in an apparatus, such as exemplified, is one of the character indicated, arranged to so control the current that approximately one-quarter ampere will pass at all times at impressed voltages within the range of from 9 to 15 volts—the variations over this range being preferably, relatively small, as, for instance, plus or minus about 3%—the normal operating voltage range of the battery 40 in the present exemplification being from 9 to 15 volts. As indicated above, the current-supply means may be means other than the engine battery. Such means, nevertheless, will ordinarily be subject to variable load conditions or will be otherwise so formed or used that the current supplied thereby will be subject to variation. In all such instances, such variations may be eliminated by the provision of a ballast tube or other suitable current-regulating means.

It is desirable that the block 2J be enclosed within an outer housing 50 and an inner housing 50a for reducing the effect on the indicating characteristics of the apparatus of the wide temperature variations encountered in flying. In the present instance, the housing 50 and 50a, with the hot portions of the engine positioned in the open portion of the housing 50 as shown, provide means whereby the temperature of the cell-block is maintained within a range of approximately 80 degrees Fahrenheit—the temperature ordinarily being maintained within a range of 70 degrees, as for example, from about 30 degrees to about 100 degrees Fahrenheit, and often within a smaller range.

Undesirable variations in galvanometer reading due to temperature variations at the point of measurement often occur; the amount of deflection of the pointer on the galvanometer in response to a given change in gas characteristics decreasing with an increase in temperature at the reference and test cells. Accordingly, the present invention in certain of its aspects contemplates the provision of means whereby variable indications of the instrument due to external temperature changes may be in part, or, if desired, substantially entirely, eliminated. These variations in galvanometer reading are due predominantly to three main influences—(a) a decrease in the electrical sensitivity of the bridge due to its increase in resistance as the temperature increases; (b) the changes in the thermal-conductivities of the gases being compared due to the change in the temperature thereof, and (c) the decrease in deflection due to the presence of increasing amounts of water vapor in the gases at increasing temperatures. It has been found that, by a control of the current flowing thru the bridge all of these factors can be compensated for. One form of means to this end is exemplified in Figs. 6 and 6a wherein there are illustrated portions of a form of construction which is similar in all respects to the form of construction exemplified in Figs. 1-5 with the exceptions below noted, corresponding parts being designated by similar reference numerals. In the form here particularly exemplified the compensating means consists of an electrical resistance 51 disposed in parallel with the portion of the circuit including the resistances 23, 23a, and 25 and 25a, being connected, in the present instance, with a lead 52 forming a part of the circuit portion 39 by means of a lead 53; and with a lead 54 forming a part of the circuit portion 39 by means of a lead 55. Preferably, in certain instances, and as exemplified, a resistance 56 having a substantially zero temperature coefficient (such for instance as a resistance composed of "Manganin" wire) is inserted in the main circuit between the point 38 and the lead 54. The resistance 51 should be subject to the same temperature conditions as the bridge. As exemplified, it is to be noted that the portions of the circuit containing the resistances 23, 23a, and 25, and 25a, and the resistance 51, are all enclosed within the housing 50a (Fig. 6a). As will be noted from Fig. 3, the scale 46 and the pointer 45 are disposed within the cockpit, being electrically connected with the bridge in the manner shown in Fig. 5.

In the form of construction exemplified in Fig. 6, the electrical resistance of the resistance element 51 increases with increasing temperature so that the proportion of current passing thru this resistance with respect to the proportion of current passing thru the bridge decreases with increasing temperature. Thus, as the temperature increases, the amount of current passing thru the resistances of the bridge will increase, and, since the deflection of the pointer in response to the action of the bridge tends to increase with increasing current, the presence of the resistance 51 tends to compensate for the tendency for an increasing temperature to decrease the amount of deflection of the pointer in response to the action of the bridge. The resistance element 51 is preferably composed of nickel wire, and its electrical resistance accordingly increases rapidly with increasing temperature. It is to be noted in this connection that the thermal coefficient of resistance (variation of resistance per ohm) per degree centigrade is .0060 for nickel, whereas it is .0038 for platinum, of which the resistances in the bridge are composed. In the form of construction exemplified, the presence of the current regulating device 47 assures against any lowering of the total current flow, so that an increase in the resistance of the element 51 will not decrease the total current flow, but will assure an increase in the current flowing thru the bridge.

By an arrangement such as exemplified, variations in galvanometer indication due to temperature variations at the point of measurement, as for instance variations in temperature at the cell-block due to any of a variety of factors, may be entirely eliminated as a practical matter over normal temperature ranges. For example, when, in the exemplified form of construction, the electrical resistance of the bridge is 7 ohms and the electrical resistance of the resistance element 56 is 7 ohms, substantially complete compensation over an external temperature range of from 30 degrees Fahrenheit to 100 degrees Fahrenheit, inclusive, may be obtained when the resistance element 51 is so formed that it has an electrical resistance of 25 ohms. Regardless of the relative electrical resistances of the bridge and the resistance element 56, and, indeed, whether or not the resistance 56 is included, such elimination of the effect of temperature variations at the point of measurement may be obtained when the electrical resistance of the branch of the circuit including the resistance 51 is about 25 ohms and when the electrical resistance of the branch including the bridge is about 14 ohms, for instance.

While as above indicated, a resistance element such as exemplified in 51 may be arranged to substantially entirely compensate for variation in the action of the bridge throughout a desired range of temperature, there are instances when the current flow which is desirable from a practical standpoint, or when constructional or other factors are of such character that it is impractical or undesirable to provide a construction wherein the elements are so arranged or formed that substantially complete compensation for external temperature variations will be obtained; and there are also instances wherein the range of temperatures to which the measuring means is subjected is of exceptionally wide extent. In certain of such cases, the degree of compensation will still be ample for practical purposes. In others, it is sometimes desirable to provide a supplemental compensating means. One form of such means is exemplified in Fig. 7, and consists of a nickel resistance 57 disposed in parallel with the galvanometer, the resistances of which are composed of copper—which has a temperature coefficient of resistance (per degree centigrade) of .004—and of other metals having a lower thermal coefficient of resistance than copper. Thus, the thermal coefficient of resistance of the resistance elements of which the meter is composed is considerably lower than the temperature coefficient of resistance of the resistance element 57. The resistance 57 in the present instance is connected across the leads 31a and 27a and is disposed within the housing 50a. When utilized in a form of construction such as exemplified in Fig. 6, the resistance 57 serves to give additional compensation for the effect of temperature on the bridge. In certain instances, however, means of this character may be utilized instead of a resistance disposed in parallel to the entire bridge, as by substituting the portion of the circuit shown in Fig. 7 for the corresponding portion of the circuit shown in Fig. 5, but it is far less effective in corrective effect, since a change in bridge current produces a change in deflection in proportion to the third power of the current change, so that even a limited readjustment of current by means of a resistance such as the resistance element 51 has a large corrective effect on the deflection. Whether the circuit portion exemplified in Fig. 7 is substituted for the corresponding portion of the circuit shown in Fig. 6, or for the corresponding portion of the circuit shown in Fig. 5, the resistance element 57 is preferably disposed within the housing 50a so that it will be subject to the same temperature conditions as the resistance elements 23, 23a, 25, and 25a.

Since certain changes may be made in the above construction and different embodiments of the invention could be made without departing from the scope thereof, it is intended that all matter contained in the above description or shown in the accompanying drawings shall be interpreted as illustrative and not in a limiting sense.

I claim:

1. The combination with an aircraft engine having an exhaust channel, of an enclosure containing a reference gas, a test chamber disposed at a point lower than a point in said channel, a conduit arranged to receive exhaust gas from said channel at the last-mentioned point and extending to said chamber and providing a conduit portion which extends substantially continuously downwardly from a point in said conduit to a point in proximity to said chamber and which is of sufficient extent to exert a condensing effect upon gases passing therethru, a return conduit extending substantially continuously downwardly from a low point in the aforesaid conduit beyond said condenser portion and in advance of said chamber to a lower point in said channel and arranged for the discharge of exhaust gas and of condensed water into said channel, and electrical measuring means comprising a resistance element in said enclosure and a resistance element in said chamber.

2. Gas testing apparatus comprising an electric circuit, a resistance bridge in said circuit, indicating means included in said bridge, a resistance thermometer in one arm of said bridge, a resistance thermometer in an adjacent arm, means providing gas to be compared in said thermometers, an electrical resistance connected across said circuit in parallel with said bridge so as to provide an alternate current-path around said bridge and having a higher thermal coefficient of resistance than said bridge, and an electrical resistance extending across said bridge in parallel with said indicating means and having a higher thermal coefficient of resistance than said indicating means.

3. Gas testing apparatus comprising an electric circuit having two parallel branches, a resistance bridge in one branch of said circuit, a resistance thermometer in one arm of said bridge, a resistance thermometer in an adjacent arm of said bridge, means for exposing said thermometers to gases to be compared, a resistance element in the other branch of said circuit, and a resistance element in the first-mentioned branch in series with said bridge, the thermal coefficient of resistance of said resistance element in said other branch being higher than the thermal coefficient of resistance of said bridge, and the thermal coefficient of resistance of said resistance element in series with said bridge being lower than the thermal coefficient of resistance of said bridge.

4. In an aircraft, in combination, an exhaust channel, a test cell, exhaust gas conduit means leading from one point in said channel to another point in said channel for supplying exhaust gas to a test cell and comprising with said test cell a closed gas system open only to said channel, means for maintaining gas in said channel at a substantially constant pressure regardless of external pressure conditions, a reference cell, and electrical measuring means comprising a thermally-responsive resistance element in said test cell and a thermally-responsive resistance element in said reference cell.

5. In an aircraft, in combination, a sealed enclosure containing water-saturated gas at a predetermined pressure and an excess of water, an exhaust channel, means to maintain gas in said exhaust channel substantially at the pressure of the gas in said enclosure regardless of external pressure conditions, exhaust-gas conduit means leading from one point in said channel to another point in said channel, a chamber communicating with said conduit means, said conduit means forming a closed gas passage, and electrical measuring means comprising a thermally-responsive resistance element in said enclosure and a thermally-responsive resistance element in said chamber.

6. In an aircraft, an internal combustion engine having an exhaust channel, means to maintain gas in said exhaust channel at substantially sea-level pressure regardless of varying external pressure conditions, means to indicate the pressure of the gas in said channel, a closed gas-circuit arranged for the flow of gas from said channel thru the circuit and back to said channel, a test chamber connected with said gas-circuit, an enclosure containing water-saturated gas at substantially sea-level pressure and an excess of water, and electrical measuring means comprising a thermally-responsive resistance element in said chamber and a thermally-responsive resistance element in said enclosure.

7. In a gas testing apparatus, in combination, a test cell, a thermally responsive resistance element in said test cell, a reference cell, a thermally responsive resistance element in said reference cell, a Wheatstone bridge including said resistance elements in adjacent arms thereof, an electrical circuit including said bridge, means providing an alternate current-path around a portion of said circuit which portion includes said bridge, said alternate path-providing means including resistance means, and said alternate path-providing means having such relative ohmic resistance with respect to the ohmic resistance of said portion and said resistance means and said alternate path-providing means having a thermal coefficient of resistance sufficiently higher than the thermal coefficient of resistance of said portion that substantially all the effect on said bridge of temperature variations within a range of from 30 degrees Fahrenheit to 100 degrees Fahrenheit at the point of measurement will be eliminated, means to maintain said bridge and said resistance means subject to substantially the same ambient temperature, current-supply means for said circuit, and means connected in said circuit to maintain substantially constant the current supplied by said current-supply means.

8. Gas testing apparatus comprising a test cell, a thermally-responsive resistance element in said test cell, a reference cell, a thermally-responsive resistance element in said reference cell, a Wheatstone bridge including said resistances in adjacent arms thereof, an electrical circuit having two parallel branches, one of said branches including said bridge and a resistance element having a thermal coefficient of resistance lower than said bridge, and the other of said branches including a resistance element having a thermal coefficient of resistance higher than said bridge and providing an alternate current-path past said first branch and having a higher thermal coefficient of resistance than said first branch.

9. In an aircraft, in combination an exhaust channel adapted to have an exhaust stream flowing therethru and therefrom, a test cell, means providing a closed system adapted to conduct exhaust gas from said exhaust stream to said test cell and to return the gas to said exhaust stream and including an elongated downwardly extending portion arranged to condense moisture from the gas flowing downwardly therethru toward said test cell and also including a downwardly extending portion arranged to return the condensed moisture to the exhaust stream, whereby both the release of gas into the aircraft and the freezing of moisture in the gas drawn from the stream are avoided, a reference cell, and electrical measuring means comprising a thermally-responsive resistance element in said test cell and a thermally-responsive resistance element in said reference cell.

10. In an aircraft, in combination, an exhaust channel, a reference cell containing gas at a predetermined pressure, means for maintaining gas in said exhaust channel substantially at the pressure of the gas in said reference cell regardless of varying external pressure conditions encountered in flight, a test cell, exhaust gas conduit means extending from one point in said channel to a lower point of said channel for supplying exhaust gas to said test cell, said conduit means providing an elongated downwardly extending condenser portion interposed between said exhaust channel and said test cell and a return portion extending downwardly from the aforesaid portion to said channel to return gas and condensed moisture to said exhaust channel and providing for communication with said test cell, said test cell and said conduit means comprising a closed gas system open only to said channel, and electrical measuring means comprising a thermally-responsive resistance element in said test cell and a thermally-responsive resistance element in said reference cell.

ULRIC O. HUTTON.